W. J. CHISM.
NUT LOCK.
APPLICATION FILED APR. 7, 1917.
1,252,088.
Patented Jan. 1, 1918.
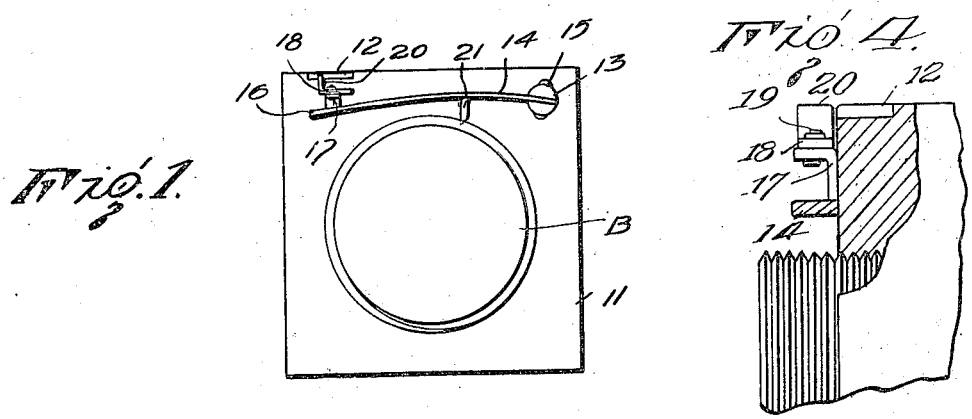
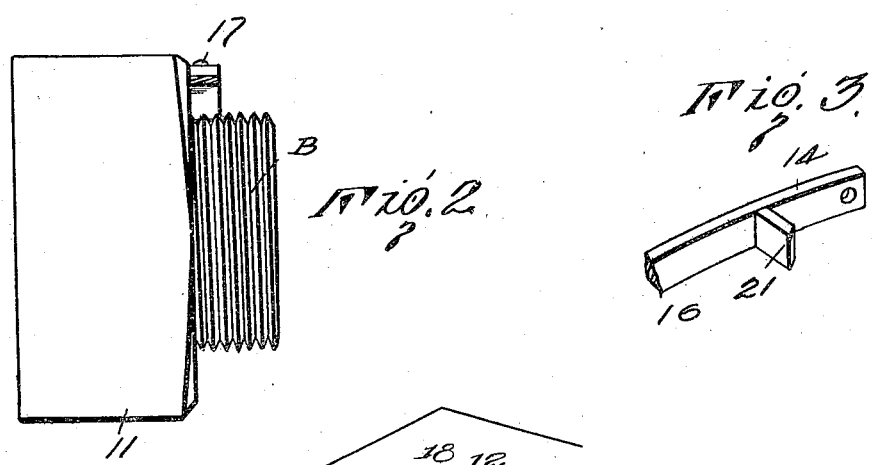
William J. Chism
Inventor
By Geo. P. Kimmel
Attorney

UNITED STATES PATENT OFFICE.

WILLIAM J. CHISM, OF CHARLES CITY, IOWA.

NUT-LOCK.

1,252,088. Specification of Letters Patent. Patented Jan. 1, 1918.

Application filed April 7, 1917. Serial No. 160,525.

*To all whom it may concern:*

Be it known that I, WILLIAM J. CHISM, a subject of the King of Great Britain, and resident of Charles City, in the county of Floyd and State of Iowa, have invented certain new and useful Improvements in Nut-Locks, of which the following is a specification.

This invention relates to new and useful improvements in nut locks, and the primary object of the invention is to provide a nut adapted to be positioned on the conventional type of bolt, and which is provided with means to lock the same in position thereon, without injury to the bolt; and also a supplemental locking means, whereby the primary locking means may be held in disengaged position, so that the nut may be placed on or removed from the bolt.

Another object of the invention is to provide a device of this character, which is easily and simply constructed, inexpensive to manufacture, and one which will be very efficient in operation.

With these and numerous other objects in view my invention consists of the novel features of construction, combination and arrangement of parts which will be herein referred to and more particularly pointed out in the specification and claims.

In the accompanying drawing:

Figure 1 is an end elevational view of the nut lock applied;

Fig. 2 is a side elevational view of the same showing the locking pawl partly in section;

Fig. 3 is a detailed perspective view of the primary locking means;

Fig. 4 is a detailed transverse section through the supplemental locking means, and Fig. 5 is a detailed perspective view of said last-mentioned locking means.

In describing my invention I shall refer to the drawing in which similar reference characters designate corresponding parts throughout the several views. My invention is applicable to the standard form of nut and bolt, as shown in the accompanying drawing, B designating a threaded bolt member, on which is positioned a nut 11, one side of said nut being provided with a semi-circular notch or groove 12, that extends oppositely from said edge, for a purpose to be hereinafter more fully described.

A lug member 13 is mounted on the outer face of the nut, and said lug being provided with a slit extending diametrically therethrough, and a locking pawl, which is formed of a bowed spring member 14, having an aperture adjacent one end thereof, said end being receivable in the slit in the lug 13, and held in position by a transversely extending rivet 15. The opposite free end of the spring 14 is enlarged as shown at 16, and when in position, this spring is disposed substantially parallel with one edge of the nut 11, the said edge being the one in which the transversely extending groove 12 is positioned.

The primary locking means of this device consists of a projection 21 formed on the inner side of the locking pawl 14, intermediate its ends, and said projection is adapted for engagement with the threads of the bolt B, owing to the fact that the spring pawl 14 is normally positioned against said bolt, and hence the projection will always be held, normally into engagement with the threads thereof, to securely lock the nut on said bolt. It is obvious that owing to the fact the locking pawl 14 is formed of a piece of spring metal, the same is swingable transversely across the face of the nut 11, and to disengage the primary locking means from the bolt, it is only necessary to swing the locking pawl 14 outwardly from said bolt, whereupon the nut may be easily removed from or placed on the bolt.

Secured to the free end of the pawl 14 is an L-shaped member 17, that has one edge of the horizontally extending portion thereof secured to the pawl by soldering, or any other desired means, and the same projects laterally therefrom adjacent the bottom edge of the pawl. The other end of the member 17 extends upwardly, and mounted on the outer face thereof is an L-shaped locking member, that has one portion pivotally connected therewith as shown at 19. The locking member is designated by the numeral 18, and the projecting angular portion 20 thereof is adapted to form a handle for the same, so that it may be easily rotated. The locking member 18 is normally positioned horizontally as shown in Fig. 4 of the drawing, when the primary locking means of the device is in operation.

In Fig. 4 of the drawing I have shown this supplemental locking means in normal position, that is, the various parts are disposed with relation to each other as when the primary locking means of the nut lock are in operation. When it is desired to release the primary locking means, and hold the same in inoperative position, the free end of the spring pawl 14 is swung outwardly across the face of the nut 11, and the projection 21 will consequently be disengaged from the threads of the bolt B. When the pawl is swung outwardly past the adjacent edge of the nut, the projection or handle 20 of the locking member is grasped and the same is swung downwardly, to the position shown in Fig. 5 of the drawing, and hence it is obvious that the end of the locking member will be positioned in the semi-circular groove or notch in the side of the bolt, and the pawl 14 will be prevented from swinging back into engagement with the bolt. To once more bring the primary locking means into operation, it is only necessary to swing the pawl 14 outwardly, and return the locking member to normal position. Owing to the fact that the groove or notch is semi-circular, the locking member may be swung back to horizontal position from either side as it will move freely into the groove or notch from either side.

From the foregoing description of the construction and operation of my new and improved nut lock, the manner of applying the same to use and the operation thereof will be readily understood, and it will be seen that I have provided a simple and efficient means for carrying out the objects of this invention. It will be understood, that various changes in the size and proportion of the various parts of this device may be made without departing from the spirit of the invention.

Having fully described my invention, what I claim as new, and desire to secure by Letters Patent, is:

1. The combination with a bolt, a nut having a groove in one side thereof positioned on said bolt, of a spring pawl having one end secured to the outer face of the nut and movable transversely across the same for normal engagement with the bolt, and an angular locking member pivotally associated with the free end of the spring pawl and adapted to be positioned in the groove in the side of the nut to lock the pawl in inoperative position when the same is swung outwardly.

2. The combination with a bolt, a nut having a semi-circular groove in one side thereof positioned on said bolt, of a spring pawl having one end secured to the outer face of the nut and movable transversely across the same, a projection on the inner side of said pawl adapted to be normally held in engagement with the bolt, a guide member secured to the outer free end of the pawl and projecting laterally therefrom, and an angular locking member pivoted on one end of the guide member and adapted to be positioned in the groove to lock the pawl in inoperative position when the same is swung outwardly.

In testimony whereof, I affix my signature hereto.

WILLIAM J. CHISM.

Copies of this patent may be obtained for five cents each, by addressing the "Commissioner of Patents, Washington, D. C."